(12) United States Patent
Haring

(10) Patent No.: US 12,275,847 B2
(45) Date of Patent: Apr. 15, 2025

(54) THIOL-ENE SILICONE ADDITIVE FABRICATION

(71) Applicant: Formlabs Inc., Somerville, MA (US)

(72) Inventor: Alexander Philip Haring, Woburn, MA (US)

(73) Assignee: Formlabs Inc., Somerville, MA (US)

( * ) Notice: Subject to any disclaimer, the term of this patent is extended or adjusted under 35 U.S.C. 154(b) by 0 days.

(21) Appl. No.: 18/394,083

(22) Filed: Dec. 22, 2023

(65) Prior Publication Data

US 2024/0158635 A1 May 16, 2024

Related U.S. Application Data

(62) Division of application No. 18/060,249, filed on Nov. 30, 2022, now Pat. No. 11,891,513.

(60) Provisional application No. 63/267,645, filed on Feb. 7, 2022.

(51) Int. Cl.
| | |
|---|---|
| *C08L 83/08* | (2006.01) |
| *B29C 64/124* | (2017.01) |
| *B29K 83/00* | (2006.01) |
| *B29K 105/16* | (2006.01) |
| *B33Y 10/00* | (2015.01) |
| *B33Y 70/00* | (2020.01) |

(52) U.S. Cl.
CPC ............ *C08L 83/08* (2013.01); *B29C 64/124* (2017.08); *B33Y 10/00* (2014.12); *B33Y 70/00* (2014.12); *B29K 2083/00* (2013.01); *B29K 2105/16* (2013.01); *C08L 2205/025* (2013.01); *C08L 2205/035* (2013.01)

(58) Field of Classification Search
CPC ....... B29C 64/124; B33Y 10/00; B33Y 70/00; B29K 2083/00; C08L 2205/025; C08L 2205/035; C08L 83/08
See application file for complete search history.

(56) References Cited

U.S. PATENT DOCUMENTS

| | | | | |
|---|---|---|---|---|
| 4,923,754 A | * | 5/1990 | Lee | C08L 83/04 |
| | | | | 428/429 |
| 6,124,490 A | * | 9/2000 | Gormley | A61K 8/042 |
| | | | | 424/60 |
| 2004/0209972 A1 | * | 10/2004 | Chambers | C08J 3/243 |
| | | | | 522/148 |
| 2016/0244625 A1 | * | 8/2016 | Clapp | C08L 83/06 |

OTHER PUBLICATIONS

USPTO. Restriction Requirement to U.S. Appl. No. 18/060,249, dated Aug. 31, 2023.

* cited by examiner

*Primary Examiner* — Nahida Sultana
(74) *Attorney, Agent, or Firm* — Honigman LLP

(57) ABSTRACT

Methods and compositions for additive manufacturing of silicone parts are provided. The methods can use SLA printing techniques to print silicone parts that exhibit excellent hardness, tear strength and elongation at break. The parts can be produced by using low dosages of radiation. In various embodiments, the silicone compositions include a mercapto-derivatized polysiloxane having two or more functional groups, an alkenyl-derivatized polysiloxane, and a photo-initiator.

12 Claims, 13 Drawing Sheets

THIOL-ENE SILICONE ADDITIVE FABRICATION

CLAIM OF PRIORITY

This U.S. patent application is a divisional of, and claims priority under 35 U.S.C. § 121 from, U.S. patent application Ser. No. 18/060,249, filed Feb. 7, 2022, which claims priority under 35 U.S.C. § 119(e) from, U.S. Provisional Patent Application No. 63/267,645, filed Feb. 7, 2022, which is incorporated by reference in its entirety.

FIELD OF INVENTION

The invention relates to materials and methods for additive fabrication.

BACKGROUND

Additive fabrication, or 3-dimensional (3D) printing, provides techniques for fabricating objects, typically by causing portions of a building material to solidify at specific locations. Additive fabrication techniques may include stereolithography (SLA), selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically, each layer is formed such that it adheres to either a previously formed layer or a substrate upon which the object is built.

SUMMARY

In one aspect, an additive method of producing a three-dimensional (3D) object is provided. The method can include providing a photocurable silicone composition in a vessel of an additive fabrication device, irradiating a layer of the photocurable silicone composition with an energy source to form an at least partially cured layer of the photocurable silicone composition on a build platform of the additive fabrication device or on a previously cured layer of the photocurable silicone composition. The photocurable silicone composition can include a mercapto-derivatized polysiloxane having two or more functional groups, an alkenyl-derivatized polysiloxane, and a photo-initiator.

In another aspect, a three-dimensional object can include a photocured silicone composition including a crosslinked alkenyl-derivatized polysiloxane and a mercapto-derivatized polysiloxane having two or more functional groups.

In another aspect, a photo-curable resin can include a crosslinked alkenyl-derivatized polysiloxane and a mercapto-derivatized polysiloxane having two or more functional groups.

In certain circumstances, providing the photocurable silicone composition can include extruding the photocurable silicone composition.

In certain circumstances, providing the photocurable silicone composition can include providing a bath of the photocurable silicone composition.

In certain circumstances, in the photocurable silicone composition, the ratio of mercapto-derivatized polysiloxane to alkenyl-derivatized polysiloxane by weight can be greater than 1:99, greater than 5:95, greater than 10:90, greater than 20:80, or greater than 30:70.

In certain circumstances, in the photocurable silicone composition, the ratio of mercapto-derivatized polysiloxane to alkenyl-derivatized polysiloxane by weight can be less than 50:50, less than 40:60, or less than 30:70.

The alkenyl-derivatized polysiloxane can have an average of at least two silicon-bonded ethylenically unsaturated groups per molecule.

The photocurable silicone composition can have a ratio of sulfur atoms to vinyl groups can be between 1:1 and 3:1, or between 1.5:1 and 2.5:1, or between 1.5:1 and 5:1, or between 2.5:1 and 5:1. The photocurable silicone composition can include a $SiO_4$ resin, a $CH_3SiO_3$ resin and/or a $(CH_3)_3SiO$ resin.

The photocurable silicone composition can include a functionalized silica, alumina, fumed silica, or carbon nanotubes, or combinations thereof.

The photocurable silicone composition can include a $SiO_4$ resin, a $CH_3SiO_3$ resin, or a $(CH_3)_3SiO$ resin, or a combination thereof. For example, the mercapto-derivatized polysiloxane can include a $SiO_4$ resin, a $CH_3SiO_3$ resin, or a $(CH_3)_3SiO$ resin, or a combination thereof. In another example, the alkenyl-derivatized polysiloxane can include a $SiO_4$ resin, a $CH_3SiO_3$ resin, or a $(CH_3)_3SiO$ resin, or a combination thereof.

The energy source can include at least one of UV laser, UV LCD, or UV DLP.

In certain circumstances, the laser can have a dosage of greater than 10 $mJ/cm^2$, greater than 20 $mJ/cm^2$, greater than 30 $mJ/cm^2$, greater than 40 $mJ/cm^2$, greater than 50 $mJ/cm^2$, greater than 60 $mJ/cm^2$, greater than 65 $mJ/cm^2$, or greater than 80 $mJ/cm^2$.

In certain circumstances, the laser can provide a dosage of less than 60 $mJ/cm^2$, less than 40 $mJ/cm^2$, less than 30 $mJ/cm^2$, or less than 20 $mJ/cm^2$.

The mercapto-derivatized polysiloxane can have a viscosity of greater than 100 cP.

The alkenyl derivatized siloxane can have a viscosity of greater than 400 cP.

At least partially cured layers in the shape of a three-dimensional object can be post-cured at a temperature between room temperature and 125° C., less than 120° C., less than 110° C., less than 100° C., less than 90° C., less than 80° C., less than 75° C., less than 70° C., less than 65° C., or less than 60° C. In certain embodiments, at least partially cured layers in the shape of a three-dimensional object can be post-cured at greater than 55° C. for at least 10 minutes.

The photocurable silicone composition can have a viscosity of greater than 500 cP, greater than 600 cP, greater than 700 cP, less than 2000 cP, less than 1000 cP, greater than 5,000 cP, greater than 10,000 cP, or greater than 15,000 cP.

The photocurable silicone composition can have a viscosity of less than 500,000 cP, less than 400,000 cP, less than 300,000 cP, less than 200,000 cP, less than 100,000 cP, less than 50,000 cP, less than 25,000 cP, less than 20,000 cP, less than 15,000 cP, less than 10,000 cP, less than 5,000 cP, less than 4,000 cP, less than 3,000 cP, less than 2,000 cP, less than 800 cP, less than 500 cP, or less than 300 cP.

The mercapto-derivatized siloxane can include a QT resin, a QM resin, a QDT resin, a D resin, a QTMD resin, or a QTM resin. In certain circumstances, the mercapto-derivatized siloxane can include propylthiol groups. In certain circumstances, the mercapto-derivatized siloxane can be essentially devoid of methyl groups. In certain circumstances, the mercapto-derivatized siloxane is not a D resin.

The alkenyl-derivatized siloxane can include a QT resin, a QM resin, a QDT resin, a D resin, a QTMD resin, or a QTM resin. In certain circumstances, the alkenyl-derivatized can include vinyl groups or acrylate groups. In certain circumstances, the alkenyl-derivatized siloxane can be essentially devoid of methyl groups. In certain circumstances, the alkenyl-derivatized siloxane is not a D resin.

The mercapto-derivatized siloxane can have an SH functionality content of greater than 4%, greater than 8%, greater than 12%, or greater than 14%.

The photocurable silicone composition can include less than 5%, less than 1%, less than 0.1%, or less than 0.01% silicone monomer, by weight. In certain circumstances, the photocurable silicone composition can include less than 5%, less than 1%, less than 0.1%, or less than 0.01% mercapto-derivatized polysiloxanes, by weight. In certain circumstances, the photocurable silicone composition can include two or more distinct mercapto-derivatized polysiloxanes. In certain circumstances, the photocurable silicone composition can include two or more alkenyl-derivatized polysiloxanes.

In certain circumstances, the composition can include a mercapto-derivatized siloxane resin wherein some or all of the methyl groups are replaced by alkylthiol groups. In other words, some or all of the organic substituents can be alkylthiol groups. For example, the mercapto-derivatized siloxane can be essentially devoid of methyl groups.

In certain circumstances, the alkenyl-derivatized polysiloxane can include a plurality of vinyl groups.

In certain circumstances, the alkenyl-derivatized polysiloxane can include a plurality of acrylate groups.

In certain circumstances, the photocurable silicone composition can include a flame retardant.

In certain circumstances, the photocurable silicone composition can include an odor neutralization agent.

In certain circumstances, the photocurable silicone composition can include a scent masking agent.

A three dimensional object made using any of these compositions can exhibit a Shore A hardness of greater than 10, greater than 20, greater than 40, or greater than 60.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

In one aspect, the methods disclosed herein are directed to the additive fabrication of silicone polymer objects. The methods can include the use of thiol-ene silicones to produce silicone objects using SLA methods. Previous attempts to produce silicone parts using SLA techniques have failed due to, for example, oxygen inhibition, viscosity problems or the inability to form well-cured parts. By implementing the thiol-ene chemistry techniques described herein, additive manufacturing can be used to produce well-defined, properly cured silicone objects that can take advantage of silicone chemistry and all of the attributes of SLA.

In additive fabrication, a desired part may be fabricated by forming successive layers of a source material on top of one another. For example, in stereolithography (SLA), a part may be fabricated by successively forming thin layers of a polymer by photocuring portions of a photopolymer liquid, typically first onto a substrate and then one on top of another. The SLA methods described herein use a photopolymer liquid that includes a mercapto-derivatized polysiloxane having two or more end groups and an alkenyl-derivatized polysiloxane. In the presence of a photoinitiator, an energy source such as a UV laser can initiate cross-linking, resulting in a polymerized silicone object. As used herein, a "thiol-ene" is a compound resulting from the addition of a thiol to an ene bond, and the mercapto-derivatized polysiloxane component of the composition may be referred to as a crosslinker.

Figure 1:
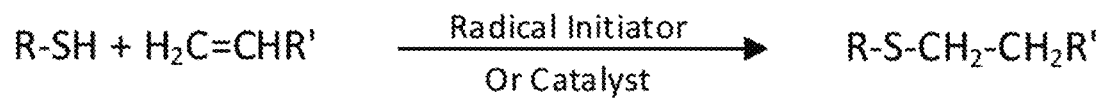
FIG. 1 illustrates a reaction of a vinyl compound and a thiolated compound.

In one aspect, a method for producing a three-dimensional object by an additive process is provided. In some embodiments the additive process is stereolithography or inverted stereolithography (SLA) and can be practiced using SLA printers such as, for example, the Form3+™ available from Formlabs. In some embodiments the polymerizable silicone composition can be extruded, for example, using a fused deposition modeling (FDM) printer, in which a high viscosity liquid is extruded from a nozzle in an uncured state and curing each layer of a product partially or fully with UV light. A polymerizable silicone composition can be catalyzed using radical initiators or chemical catalysts. In some cases the radical initiator is activated by radiation that can be provided by, for instance, a UV source (222-450 nm) such as a laser, DLP or LCD. In particular embodiments, the source is a UV laser. A photocurable silicone composition can include at least two silicone pre-polymers and a photoinitiator. One or more pre-polymers can be an alkenyl-derivatized polysiloxane. An alkenyl-derivatized polysiloxane is a polysiloxane that includes vinyl groups that can be reacted according to the mechanism shown in FIG. 1. Another pre-polymer in the photocurable silicone composition can be a mercapto-derivatized polysiloxane capable of crosslinking the alkenyl-derivatized polysiloxane. The photocurable composition can also include a photoinitiator.

Three dimensional objects made from the photocurable silicone composition exhibit features that have not been obtainable with other formulations. For instance, attempts at SLA printing with other silicone systems have resulted in the highly blurred objects with poor tear strength and elongation. By using high molecular weight mercapto-derivatized polysiloxane and high molecular weight alkenyl-derivatized polysiloxane with a photoinitiator, well-defined 3D objects have been printed using SLA printers. The resulting objects exhibit reduced tackiness, improved tear strength and improved elongation at break.

The energy source can include at least one of UV laser, UV LCD, or UV DLP.

In certain circumstances, the laser can have a dosage of greater than 10 mJ/cm$^2$, greater than 20 mJ/cm$^2$, greater than 30 mJ/cm$^2$, greater than 40 mJ/cm$^2$, greater than 50 mJ/cm$^2$, greater than 60 mJ/cm$^2$, greater than 65 mJ/cm$^2$, or greater than 80 mJ/cm$^2$.

In certain circumstances, the laser can provide a dosage of less than 60 mJ/cm$^2$, less than 40 mJ/cm$^2$, less than 30 mJ/cm$^2$, or less than 20 mJ/cm$^2$.

In some cases, the objects do not require postproduction curing. At least partially cured layers in the shape of a three-dimensional object can be post-cured at a temperature between room temperature and 125° C., less than 120° C., less than 110° C., less than 100° C., less than 90° C., less than 80° C., less than 75° C., less than 70° C., less than 65° C., or less than 60° C. In certain embodiments, at least partially cured layers in the shape of a three-dimensional object can be post-cured at greater than 55° C. for at least 10 minutes. Postproduction curing can be conducted at room temperature. In certain circumstances, the object can be submerged in a liquid during curing. For example, the liquid can be water or glycerine. In certain circumstances, postproduction curing can take place in an inert atmosphere, for example, under a nitrogen or argon atmosphere.

Viscosity is measured using a 50 mm parallel plate rheometer at 10 Hz. The photocurable silicone composition can have, in various embodiments, a viscosity of greater than 500 cP, greater than 600 cP, greater than 700 cP, greater than 1000 cP, greater than 2000 cP, greater than 5,000 cP, greater than 10,000 cP, greater than 15,000 cP, greater than 25,000 cP, greater than 40,000 cP, greater than 50,000 cP, or greater than 60,000 cP. In certain circumstances, the photocurable silicone composition can have, in various embodiments, a viscosity of less than 500,000 cP, less than 400,000 cP, less than 300,000 cP, less than 200,000 cP, less than 100,000 cP, less than 60,000 cP, less than 50,000 cP, less than 20,000 cP, less than 15,000 cP, less than 10,000 cP, less than 5,000 cP, less than 4,000 cP, less than 3,000 cP, less than 2,000 cP, less than 800 cP, less than 500 cP, or less than 300 cP.

The photocured silicone composition can have a ratio of mercapto-derivatized polysiloxane to alkenyl-derivatized polysiloxane by weight of greater than 1:99, greater than 2:98, greater than 5:95, greater than 10:90, greater than 20:80, greater than 30:70, less than 50:50, less than 40:60, less than 30:70, less than 20:80, less than 10:90, less than 5:95, or less than 2:98.

In the photocurable silicone composition, the ratio of sulfur atoms to vinyl (or acrylate) groups (enes) can be, for example, greater than 1:1, greater than 1.5:1, greater than 2.0:1, greater than 2.5:1, greater than 3.0:1, less than 3.0:1, less than 2.5:1, less than 2.0:1, less than 1.5:1, or less than 1:1.

The photocurable silicone composition can include a SiO$_4$ resin, a CH$_3$SiO$_3$ resin or a (CH$_3$)$_3$SiO resin, or combinations thereof.

More particularly, the polysiloxanes may include different structural units that are known in the art as M, D, T, and Q structures. M compounds include three methyl groups bonded to the silicon atom. D compounds include two methyl groups bonded to the silicon atom. T compounds include a single methyl group bonded to the silicon atom. Q compounds include only Si—O bonds and do not include methyl or other carbon groups. A resin can have a combination of two or more of M, D, T and Q structures. Various resins may be combinations of these types, such as QM, QT, MDT, QDT, MTQ, MDQ, QTM, QTDM, and others. In some embodiments the alkenyl-derivatized polysiloxane can include a Q resin, M resin, or a QM resin. A VQM designation indicates a QM resin terminated with vinyl groups. As an example, the alkenyl-derivatized polysiloxane can include 70% vinyl terminated siloxane and 30% VQM resin. In certain embodiments, the alkenyl-derivatized polysiloxane can include acrylate groups. For example, the acrylate group can be a methacrylate group. In certain circumstances, the alkenyl-derivatized polysiloxane can be a mixture of vinyl-, acrylate- or methacrylate-derivatized siloxane.

In other cases, D and T resins may also be included. For example, the mercapto-derivatized polysiloxane can be greater than 5, greater than 10, greater than 20 or greater than 30% Q with the balance being M, T, D or a combination thereof. In some cases, the resin is a combination that includes both Q and M (QM), and the mercapto-derivatized polysiloxane can be greater than 5, greater than 10, greater than 20 or greater than 30% QM resin. In another set of embodiments, the resin can include QT and the ratio of Q:T can be greater than 10:90, greater than 20:80 or greater than 30:70. In certain circumstances, the D content can be less than 5%, less than 1%, or 0%.

Other functional groups may replace the methyl groups and can include, for instance, vinyl groups in the case of alkenyl-derivatized polysiloxanes. In various embodiments, the polymerizable silicone composition can include greater than 5%, greater than 10%, greater than 15% or greater than 20% Q resins. In these and other embodiments, the amount of M resin can be greater than 1%, greater than 5% or greater than 10% of the total silicone resin content. In specific embodiments, mercapto-derivatized polysiloxane can be, for example, a Q resin, an M resin, a T resin, a D resin, or any combination of the four. As used herein, a combination resin (e.g., QM or QT) is a single polymeric structure that contains more than one type of siloxane unit. It is not simply a mixture of different molecular compounds.

The photoinitiator can be a compound that transforms into an active radical (radical initiator) or ion (cationic initiator) when irradiated with radiation such as UV light. Nonlimiting examples of cationic initiators include acylphosphine oxides, aminoalkylphenones, dialkoxyacetophenones, hydroxyalkylphenones, benzil ketals, dialkoxyanthracenes, and benzoin ethers. Nonlimiting examples of radical initiators include anthraquinones, benzophenones/amines and thioxanthones/amines. The photoinitiator can be included at concentrations of, for example, greater than or equal to 0.1%, 0.5%, 1.0%, 1.5%, 2.0% or 2.5%, by weight.

The alkenyl-derivatized polysiloxane can be a polysiloxane that includes a prevalence of alkenyl groups that react with the thiol groups of a mercapto-derivatized polysiloxane via alkene hydrothiolation in the presence of radiation and a photoinitiator. The alkenyl-derivatized polysiloxane can also contain methyl or other functional groups. The alkenyl-derivatized polysiloxane can be linear, cyclical or branched or any combination thereof. In some embodiments of the photocurable silicone composition the alkenyl-derivatized polysiloxane is branched and can be essentially free of linear polysiloxanes. For example, there may be less than 5%, less than 2% or less than 1% linear polysiloxanes in the photocurable composition. The average molecular weight of the alkenyl-derivatized polysiloxane can be, for example, greater than 1 kDa, greater than 5 kDA, greater than 10 kDa, greater than 20 kDA, or greater than 50 kDa. In the same and other embodiments, the polysiloxane can exhibit a molecular weight of less than 200 kDa, less than 100 kDa, less than 70 kDa, less than 50 kDa, or less than 30 kDa. The alkenyl-derivatized polysiloxane may account for greater than 90, greater than 80, greater than 70, greater than 60, greater than 50, greater than 40, or greater than 30 percent of the photocurable silicone composition, by weight.

Figure 2:
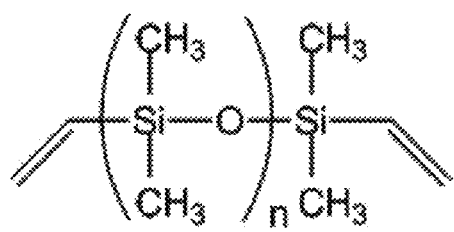
FIG. 2 provides a structural example of an alkenyl-derivatized polysiloxane.
Figure 3:
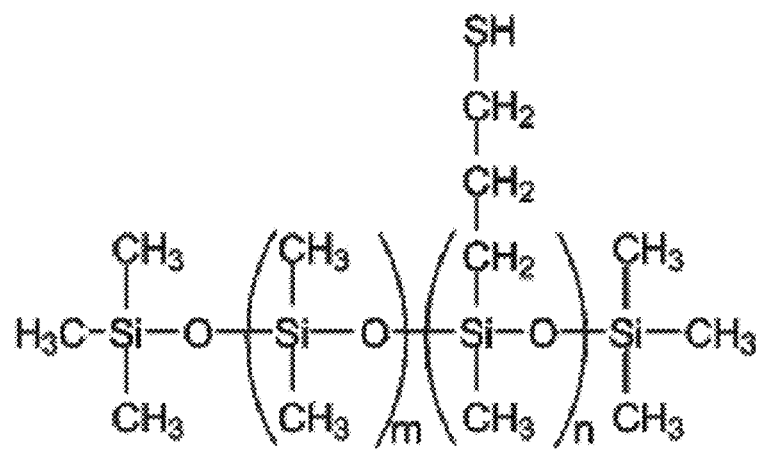
FIG. 3 provides a structural example of a linear mercapto-derivatized polysiloxane.
Figure 4:
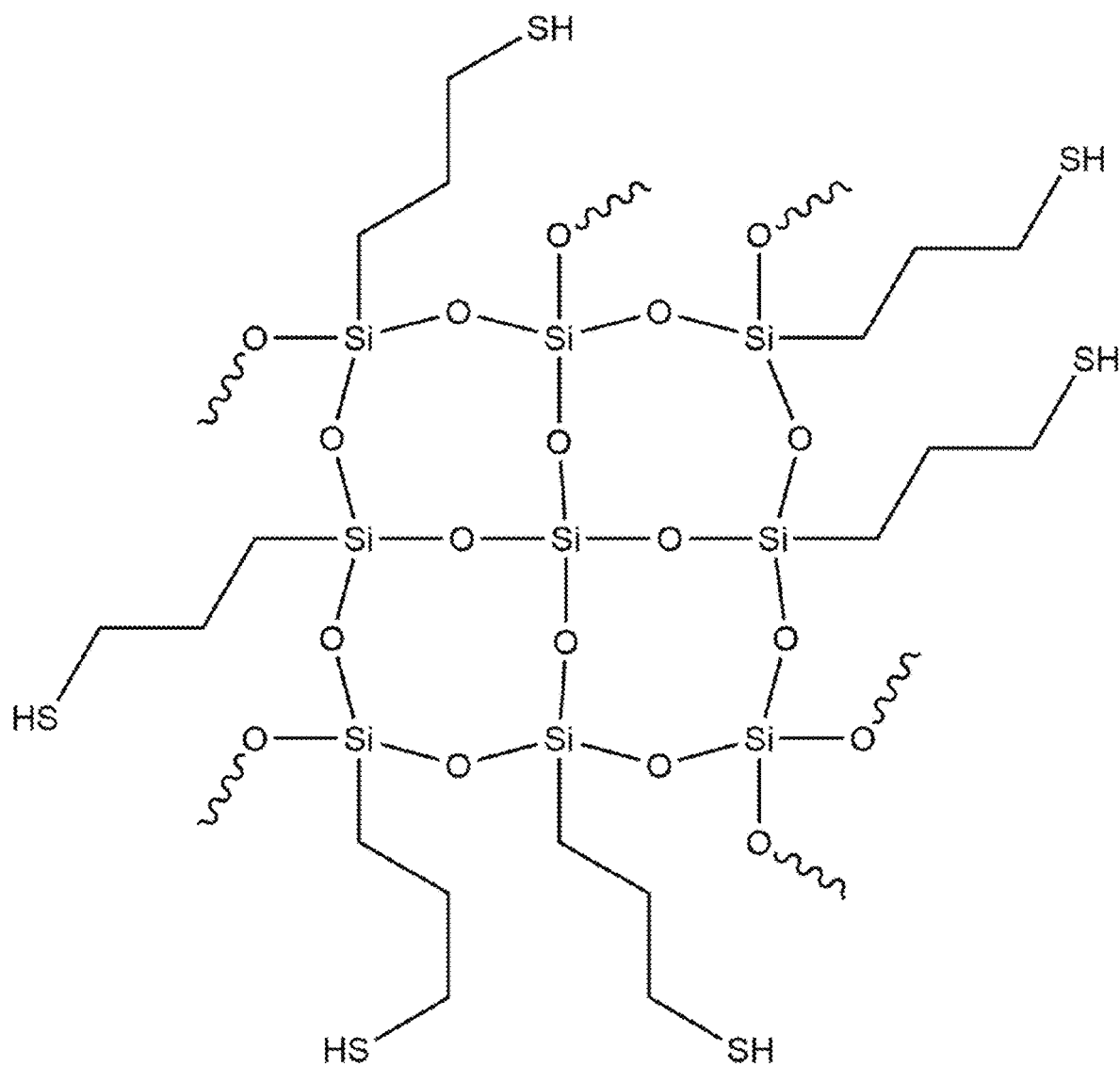
FIG. 4 provides a structural example of a branched mercapto-derivatized polysiloxane.

The mercapto-derivatized polysiloxane includes thiol groups and can have, for example, greater than 1, greater than 2, greater than 3, greater than 5, greater than 6, fewer than 10, fewer than 8, fewer than 7, fewer than 6, fewer than 5, fewer than 4 or fewer than 3 thiols per molecule. The mercapto-derivatized polysiloxane can be linear or branched. As used herein, a linear polysiloxane includes repeating units of $SiOR_2$ where R can be H, O or $C_n$. In certain circumstances, the thiol content of the mercapto-derivatized polysiloxane can be between 4 and 6% by weight. In other circumstances, the thiol content can be about 10%, which can lead to products that have high strength and hardness. For example, products can have a hardness of 50 A and 100% elongation at break. In various embodiments, n can be 0, 1, 2, 3, >0, >1, >2, or >3. Examples of linear siloxanes are provided in FIGS. 2 and 3. A branched polysiloxane is a polysiloxane that includes siloxane units bound to more than just two adjacent, linear siloxane units. Compared to a linear polysiloxane, in a branched mercapto-derivatized polysiloxane some or all of the methyl groups have been replaced with alkyl thiol groups that may include 3 or more carbons per alkyl thiol group. A siloxane unit in a branched polysiloxane can include siloxane units that are bound to three or four siloxane units, and a branched silicone must therefore include at least some Q and/or T bonding. Q compounds are those bound to four adjacent siloxane units, T compounds are those bound to three adjacent siloxane units. Branched polysiloxanes can include combinations of Q, T, D, and M but must always include at least some Q or T. An example of Q is shown in FIG. 4. Branched compounds may be considered to be partially cross-linked already due to the non-linear structure and are reactive to UV light in the presence of a photoinitiator.

In certain circumstances, the photocurable silicone composition can include a silane compound, for example a polysiloxane including Si—H units. The Si—H units can be less than 5%, less than 3% or less than 1% of the photocurable silicone composition. A catalyst, for example, a platinum catalyst, can be added to the photocurable silicone composition to assist with silane crosslinking reactions.

The molecular weight of the polysiloxane can be, for example, 3 to 4 kDa, 5 to 7 kDa, 8 to 10 kDa, greater than 3 kDa, greater than 5 kDA, greater than 8 kDa, greater than 50 kDa, or less than 100 kDa. The viscosity of the mercapto-derivatized polysiloxane can be greater than 100 cP, greater than 200 cP, greater than 500 cP, greater than 1,000 cP, or greater than 5,000 cP. In other embodiments the viscosity of the mercapto-derivatized polysiloxane can be less than 1,000 cP, less than 500 cP, or less than 200 cP.

Additional additives may be incorporated into the photocurable silicone composition. For example, additives can be used to alter viscosity, to improve tear strength, to enhance conductivity, to reduce brittling, improved tear strength, and to provide color or opacity. Various additives may be soluble in the silicone composition or may be emulsified, mixed or dispersed therein. For instance, functionalized metal oxides, such as vinyl silica, or a silicone elastomer, can be added for improved strength. Brittling of cured material during aging can be improved with the addition of hindered amines, such as the Tinuvin light stabilizers from BASF. For example, 0.5 to 1.0 phr of a hindered amine can exhibit this improvement. Additives such as silica can be functionalized to improve dispersibility as well as to be incorporated into the polymer. As the photocurable silicone composition may be stored for an extended time before it is printed, additives can be selected, or treated, for improved dispersion stability. Additives can include antioxidants, for example, hindered phenols. Additional additives include, for instance, organic and inorganic pigments, conductivity enhancers such as carbon black, carbon nanotubes, ceramics, and metals, and antimicrobial additives. The photocurable silicone composition can include a functionalized silica, alumina, fumed silica, or carbon nanotubes, or combinations thereof. For example, carbon black can be added to a composition to provide grey or black color. Carbon black can also improve small and negative features on a cured product while allowing full cure of the interior of the product. For example, a composition can have a carbon black content of about 0.05 phr.

In certain circumstances, the photocurable silicone composition can include a flame retardant. A flame retardant can include aluminum oxides, aluminum hydroxides, magnesium oxides, magnesium hydroxides, borates, salt hydrates, organohalogen compounds (including brominated compounds and chlorinated compounds, or organophosphorus compounds (including phophonate, phosphinate and phosphate compounds).

In certain circumstances, the photocurable silicone composition can include an odor neutralization agent. An odor neutralization agent can include a oxidizing agent, for example, chlorine, a chlorine oxide, a carboxylic acid, a peroxide, or ozone, or a reactive compound, such as an oxirane. The oxirane can be a mono or difunctional expoxide.

In certain circumstances, the photocurable silicone composition can include a scent masking agent. A scent masking agent can include a pleasant smelling compound, for example, a natural oil or extract, for example, esters, such as octyl acetate, benzaldehydes, such as vanillin, lactones, or terpenes, such as limonene.

EXAMPLES

Example 1

A high molecular weight alkenyl-derivatized polysiloxane and high molecular weight mercapto-derivatized polysiloxane were polymerized at different ratios as provided in Table 1. DMS-V25 is a vinyl terminated silicone available from Gelest that has a molecular weight of 17.2 kDa and a viscosity of 500 cP. SMS-042 is a mercapto-derivatized silicone from Gelest that comprises 4-6% thiol and a viscosity of 150 cP. In addition, each sample includes photoinitiator or a mix of photoinitiators (e.g., phosphine oxide photoinitiators sensitive to the wavelength of the curing light source and optical brightener (e.g., Uvitex OB (BASF) 2, 5 thiophenediyl bis(5-tert-butyl-1,3-benzoxazole)).

TABLE 1

| Sample ID | % Alkenyl siloxane DMS-V25 | % Mercapto-derivatized siloxane SMS-042 | % Photoinitiator and Optical Brightener | Printable | Properties |
|---|---|---|---|---|---|
| A1 | 50 | 50 | 2% phosphine oxide photoinitiator, 0.05% optical brightener | Y | Soft, stretchy |
| A2 | 70 | 30 | 2% phosphine oxide photoinitiator, 0.05% optical brightener | Y | Soft, elastic, stronger than A1 |
| A3 | 80 | 20 | 2% phosphine oxide photoinitiator, 0.05% optical brightener | Y | Soft, elastic, stronger than A1 |
| A4 | 90 | 10 | 2% phosphine oxide photoinitiator, 0.05% optical brightener | N | Very soft, weak and tacky |
| A5 | 99 | 1 | 2% phosphine oxide photoinitiator, 0.05% optical brightener | N | Did not cure to object |

Compositions with a thiol content of about 2-3% produced a softer cured material. Composition with a higher thiol content, for example, 13-17%, can produce harder cured material.

Example 2

Figure 5:
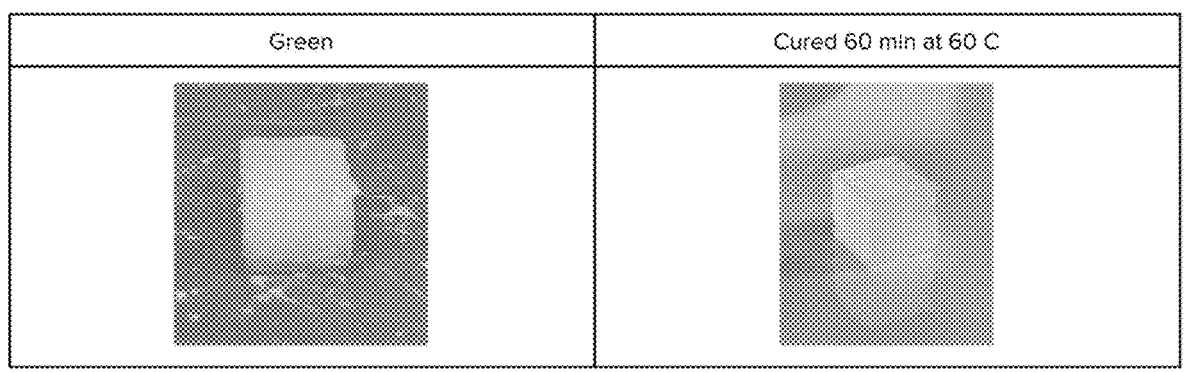
FIG. 5 is a photocopy of a photograph of 1 cubic centimeter silicone cubes of one embodiment.

A composition similar to those of Example 1 was made with 75% DMS-V25, 25% SMS-042, 2.5% phosphine oxide photoinitiator, 0.05% optical brightener, and 10 phr HiSil 233 (vinyl silica). This composition had a viscosity of about 800 cP and is referred to as photocurable silicone composition B1. Composition B1 was used to print cubes with the Form3 SLA printer at an exposure of 40 mJ/cm². 1 cubic centimeter cubes were printed and are shown in FIG. 5 before and after postproduction curing at 60 degrees C. for 60 minutes. The cube exhibited a Shore A hardness of 15 after curing.

Example 3

Figure 6:
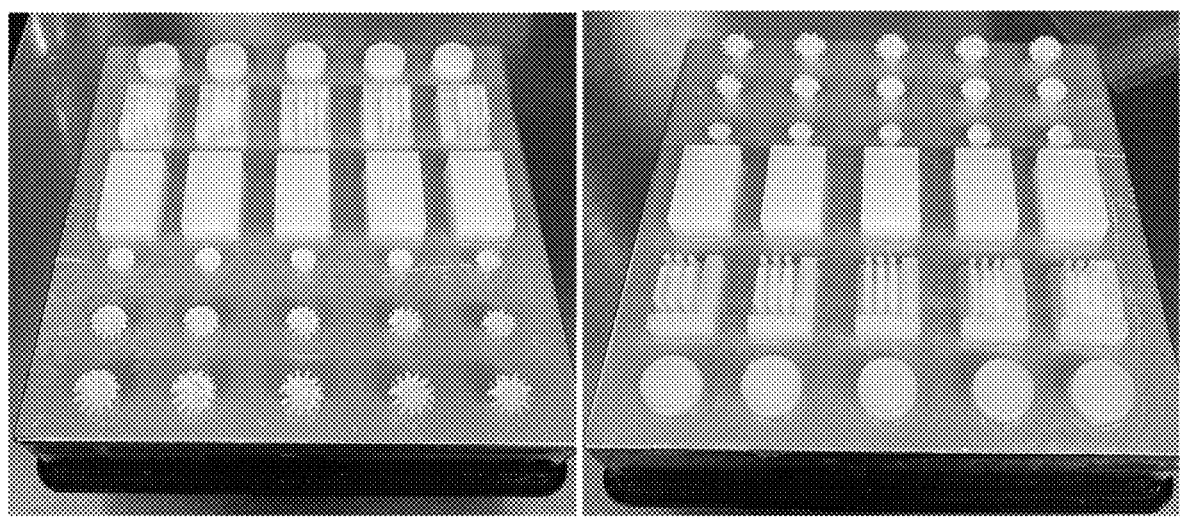
FIG. 6 is a photocopy of a photograph of 3D silicone objects made from another embodiment.
Figure 7A:
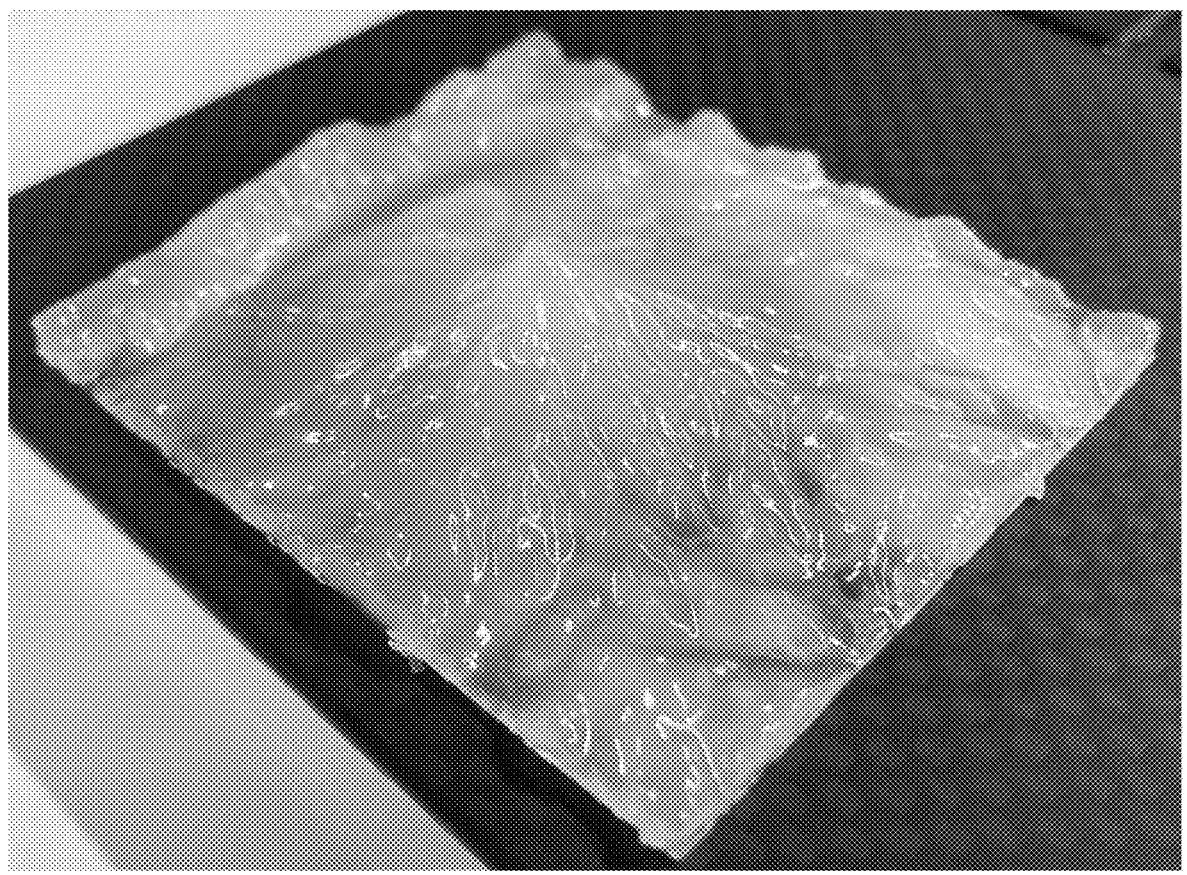
FIGS. 7A and 7B are photographs of silicone objects made using additional embodiments.
Figure 7B:
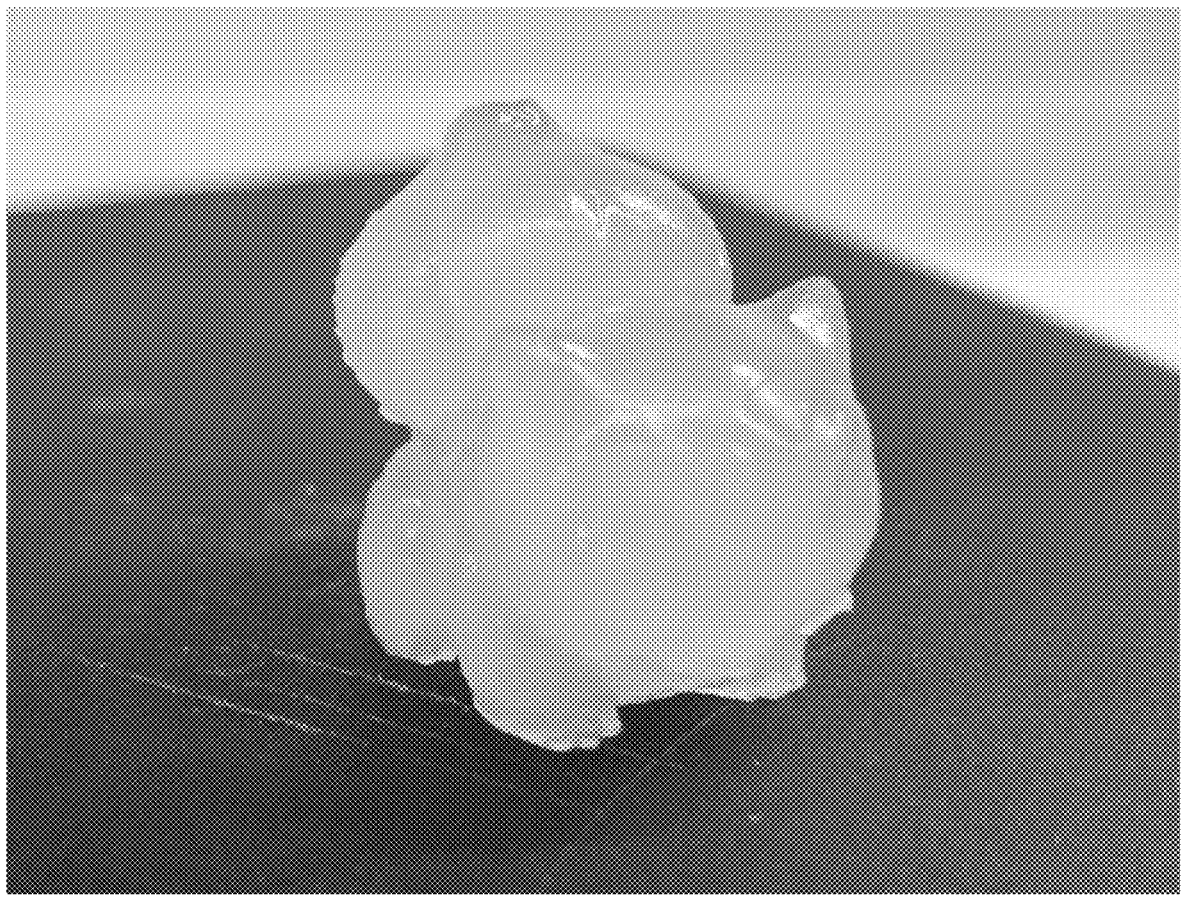

An exposure sweep from 35 to 70 mJ/cm 2 was performed on composition B1 and the resulting prints showed improved results at 70 mJ/cm 2 while all negative features were still legible. Next, a sweep was performed over a range of 65 to 130 mJ/cm². Photographs of the prints are provided in FIG. 6 and, from left to right, show samples produced at exposures of 65, 70, 85, 105 and 130 mJ/cm². The samples indicate that negative features were partially or completely filled above 75 mJ/cm². A fill and skin of 70 mJ/cm 2 was chosen as providing a suitable print for composition B1. Additional objects were printed using composition B1. FIG. 7A is a picture of a printed relief map and FIG. 7B is a picture of a printed Bulbasaur. The objects were washed with isopropanol (IPA) after printing.

Example 4

Another composition, C1, was produced using an alkenyl-derivatized polysiloxane that included vinyl functional Q resin, vinyl functional M resin and high molecular weight vinyl terminated silicone. The alkenyl-derivatized polysiloxane included 30% VQM resin and 70% of vinyl terminated silicone. This component is available from Gelest as VQM-135. The amount of mercapto-derivatized polysiloxane was set at a thiol:ene ratio of 30:70 and HiSil 900 was used as an additive. In the samples shown in Table 2, DMS-V25 was added to bring the alkenyl-derivatized polysiloxane to 70% for each sample. For example, sample C1 was 70% DMS-V25 and sample C6 was 10% DMS-V25. The HiSil 900 is added at listed quantities of per hundred rubber (PHR) meaning that, for example, sample C5 included 5 parts HiSil 900 added to 100 parts resin. Results show increasing viscosity as well as hardness with higher amounts of VQM material. There is also an increase in hardness and viscosity with additional amounts of silica.

TABLE 2

| ID # | VQM-135% | HiSil 900 PHR | Hardness (A) | Viscosity (qualitative) | Printable? |
|---|---|---|---|---|---|
| C1 | 0 | 0 | 8 | Low | Yes |
| C2 | 10 | 0 | 15 | Low | Yes |
| C3 | 35 | 0 | 18 | Moderate | Yes |
| C4 | 60 | 0 | 21 | Moderate | Yes |
| C5 | 35 | 5 | 24 | Moderate | Yes |
| C6 | 60 | 10 | 29.5 | Paste | Did not test |

Example 5

Figure 8:
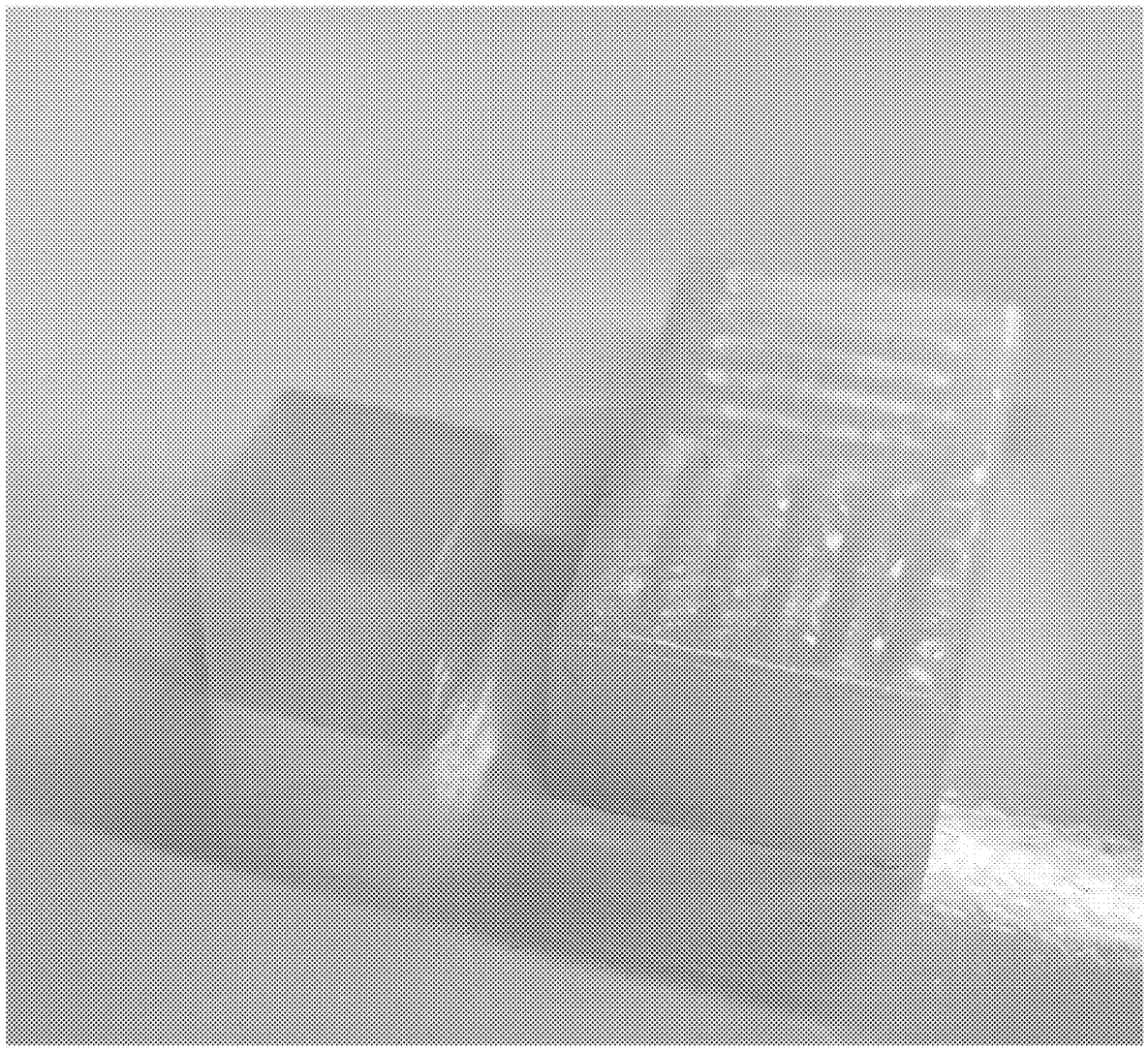
FIG. 8 is a photograph of two different silicone objects made using different compositions.

Composition D1 was produced using the components in Table 3 and was printed in a cube at 70 mJ/cm². Results were preferred to those from composition C1 in that the surfaces and corners were noticeably improved. A comparison of a cube printed with D1 (left) is compared to a cube printed with C1 (right) in FIG. 8. The photograph illustrates that the edges of the D1 material are sharper and the surfaces more planar.

TABLE 3

| Component | Amount |
|---|---|
| DMS-V25 | 35% |
| VQM-135 | 35% |
| SMS-042 | 30% |
| Phosphine Oxide Photoinitiator | 2.5 phr |
| Optical Brightener | 0.05 phr |
| HiSil 900 | 5 phr |

Figure 9A:
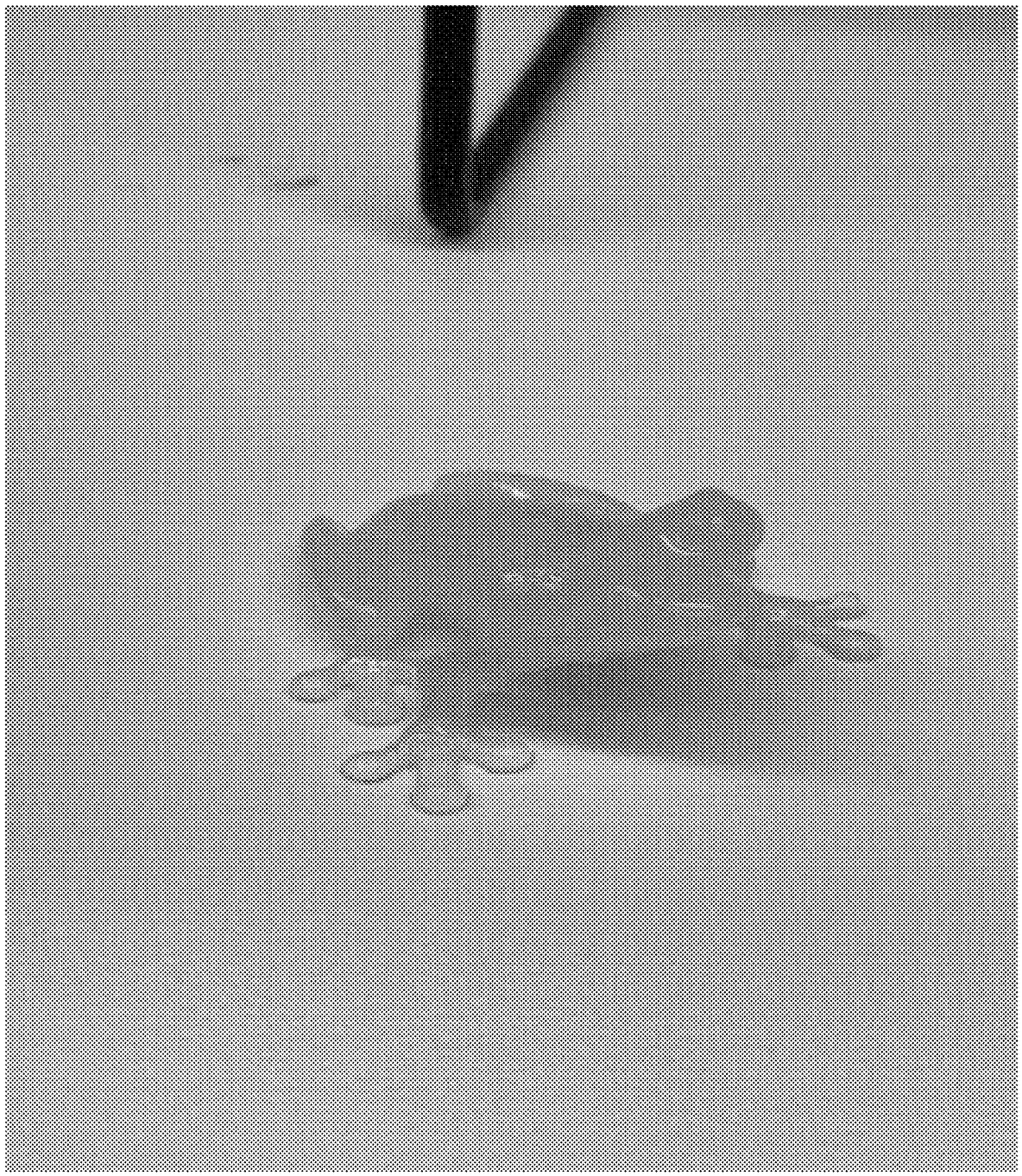
FIG. 9A provides a photograph of a 3D frog after printing.
Figure 9B:
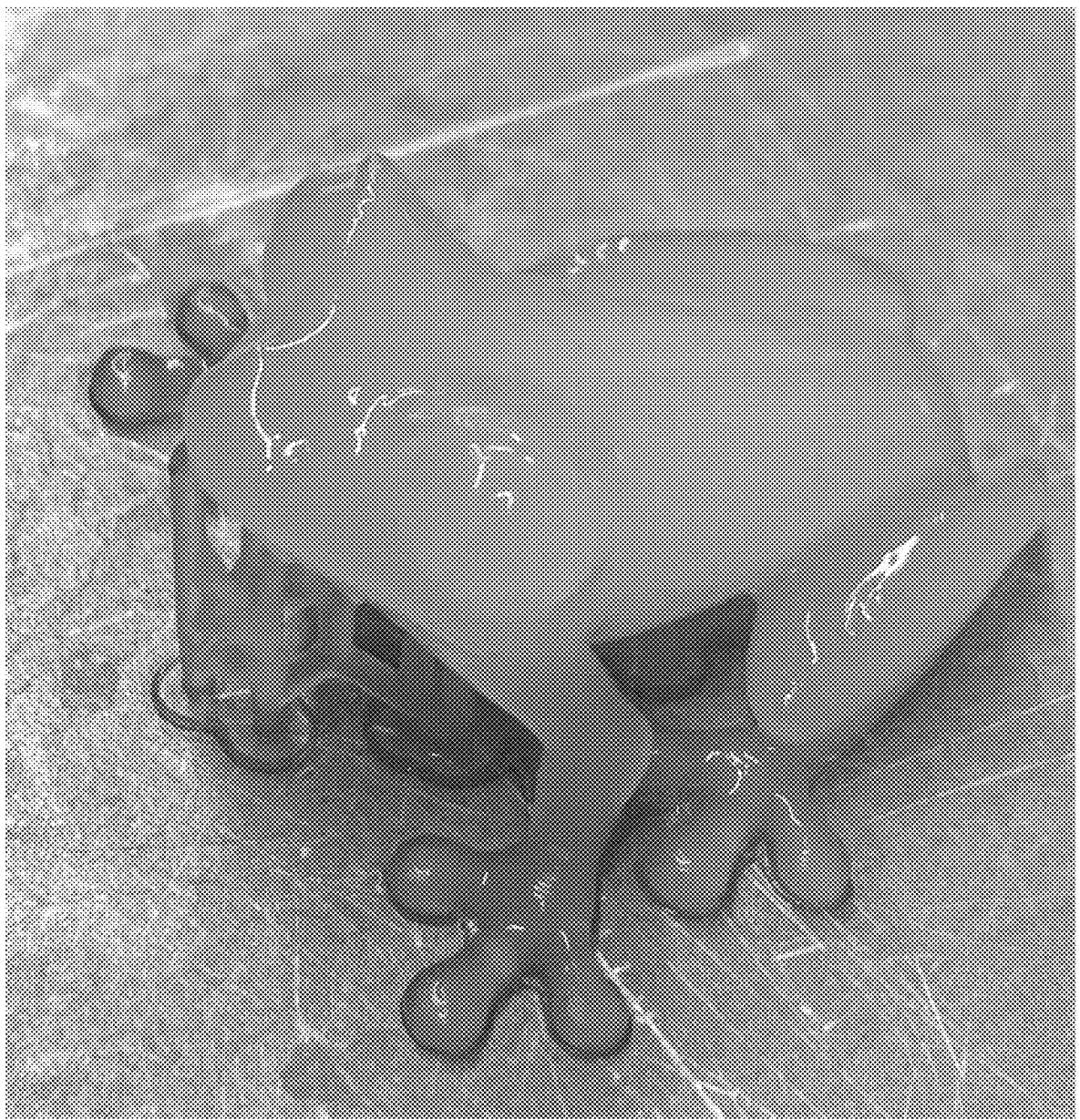
FIGS. 9B and 9C are photographs of the frog of FIG. 9A after post-production curing.
Figure 9C:
Figure 10A:
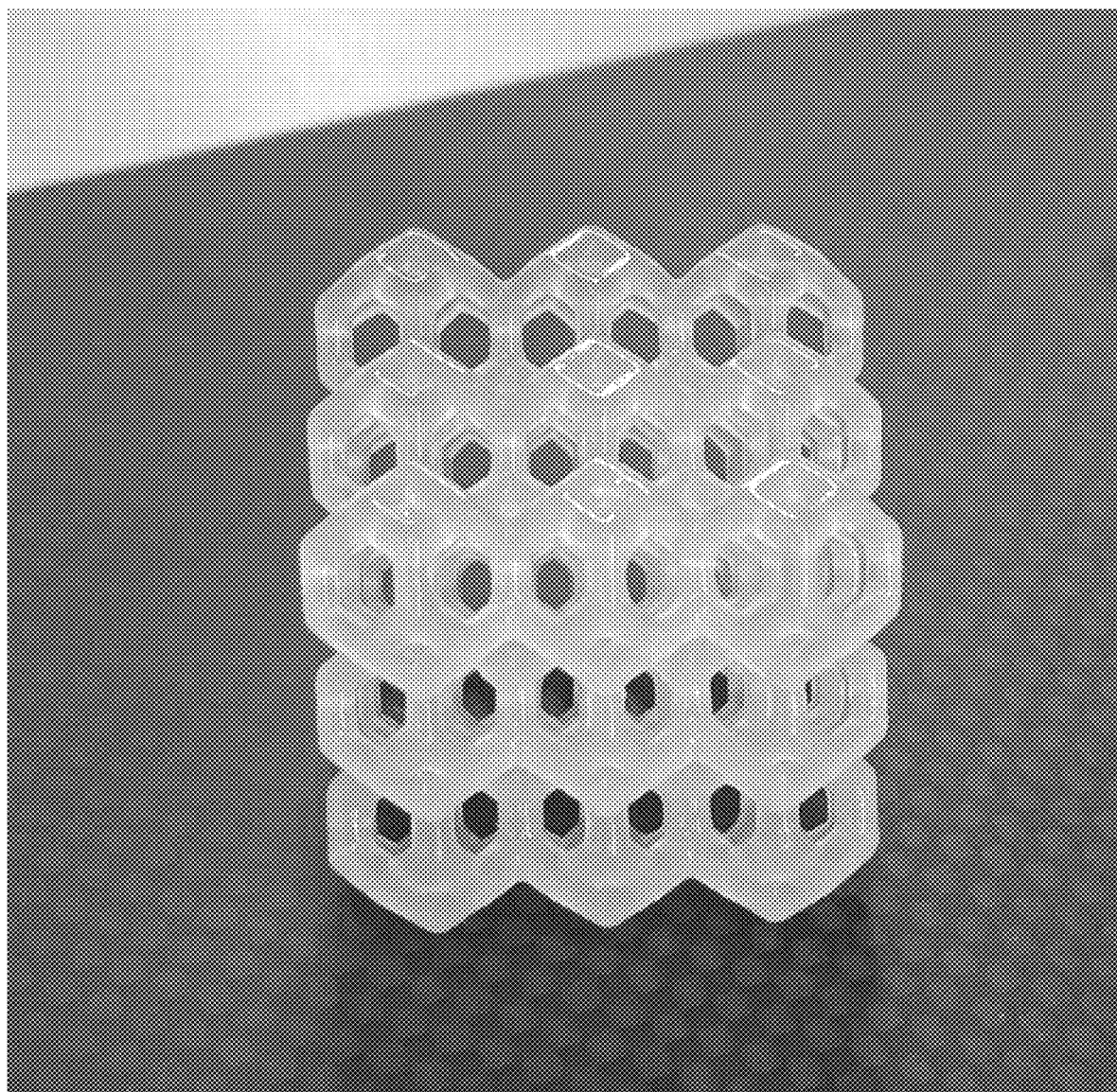
FIGS. 10A, 10B and 10C show lattices printed using compositions of embodiments disclosed herein.
Figure 10B:
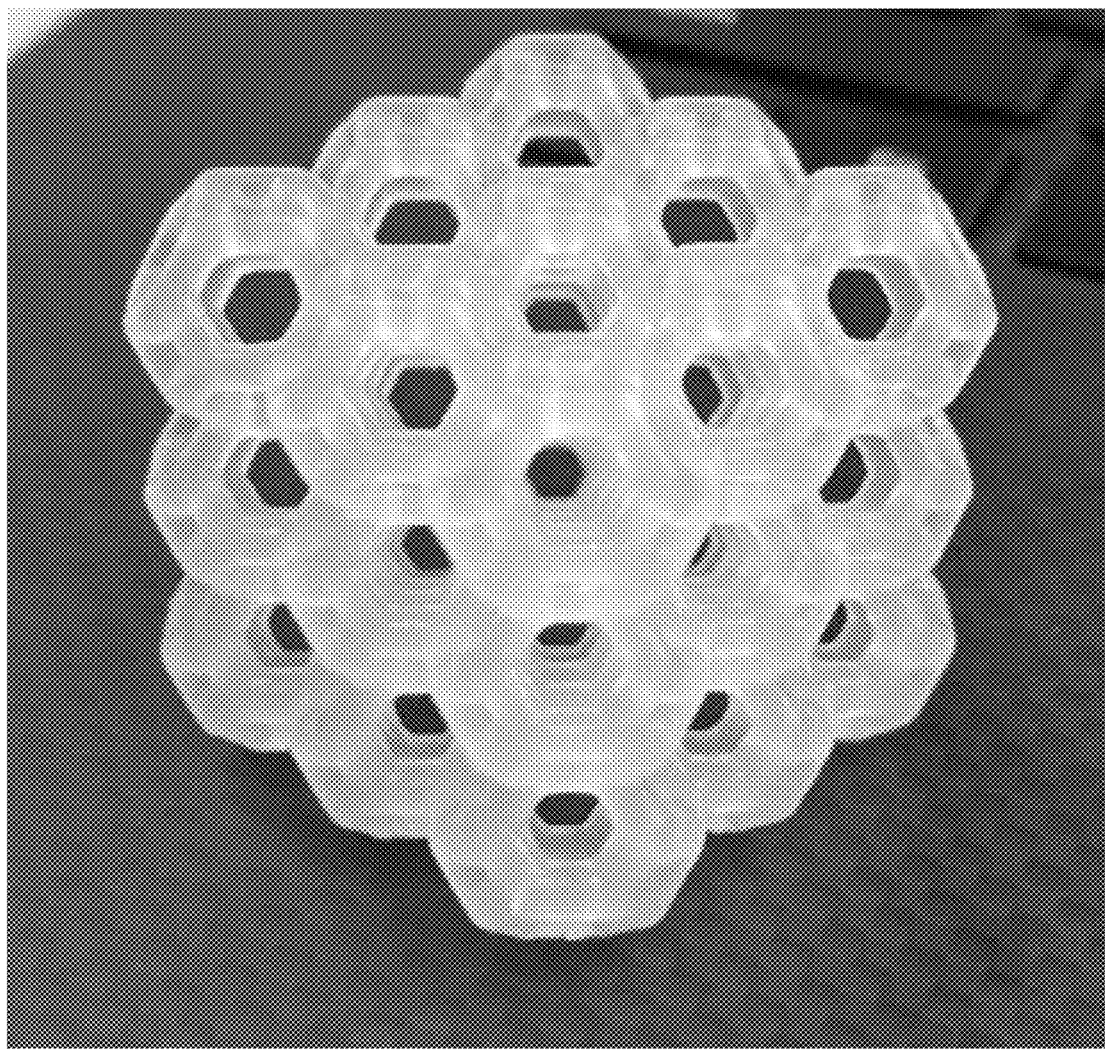
Figure 10C:
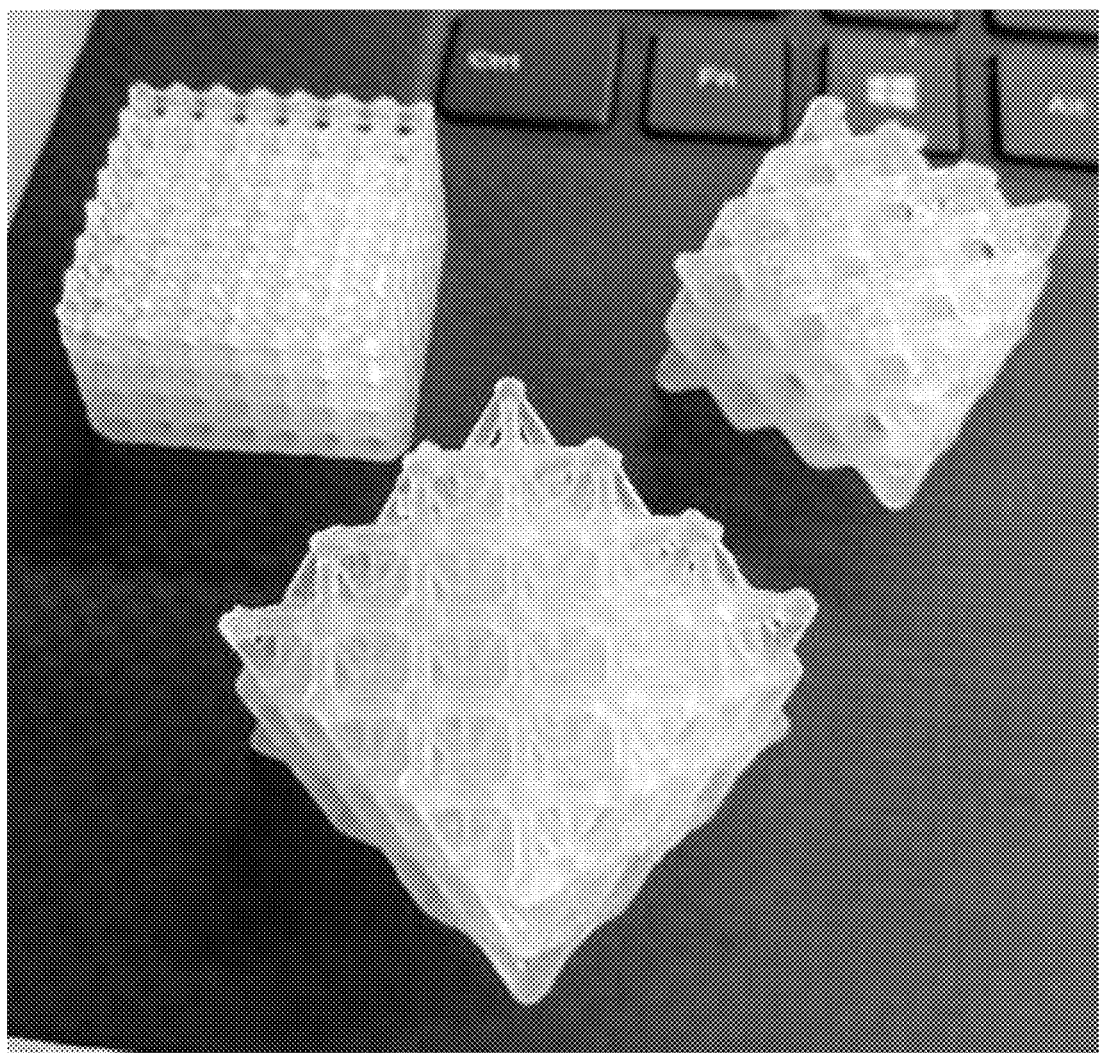

Additional objects were printed with D1. FIG. 9 illustrates a printed frog, as printed (FIG. 9A), and as cured at room temperature (FIGS. 9B and 9C). FIGS. 10A-10C show lattices that were printed under the same conditions as above using composition D1.

Example 6

Three different compositions were tested to evaluate the effect of different types of mercapto-derivatized polysiloxanes in the physical properties of the printed object. In each composition the same alkenyl-derivatized polysiloxane was used at 90% by weight of the composition. The specific mercapto-derivatized polysiloxane component in each composition was varied but the concentration was kept constant at 10% by weight. The first example, E1, included a mercapto-derivatized silicone homopolymer. The second, E2, was a mercaptosilicone/methyl silicone copolymer. The third, E3, was a branched mercaptosilicone of QT type. Each sample was printed using the Form3 SLA printer and samples were analyzed for hardness, tensile strength and elongation at break. Tensile strength and elongation at break were measured using ASTM D412 with type C samples.

TABLE 4

| Sample ID | Mercapto-derivatized polysiloxane | Hardness (Shore A) | Tensile Strength (MPa) | Elongation at Break (%) | Minimum Energy Dosage to Print (mJ/cm$^2$) |
|---|---|---|---|---|---|
| E1 | mercaptosilicone homopolymer | 50 | 3.6 | 105 | 20 |
| E2 | mercaptosilicone methyl silicone copolymer | 39 | 1.6 | 62 | 35 |
| E3 | QT resin type mercaptosilicone | 58 | 6.1 | 145 | 10 |

These results indicate that the use of a branched mercapto-derivatized polysiloxane in SLA printing provides a printed silicone object that exhibits greater hardness, improved tensile strength and greater elongation at break when compared to the same composition that uses the traditional mercapto-derivatized silicone homopolymer or mercapto-derivatized silicone methyl silicone copolymer. This improvement is realized at the same ratio of alkenyl-derivatized polysiloxane to mercapto-derivatized polysiloxane and also at the same or a similar ratio of thiol groups to alkene bonds. The results also show that well-defined silicone objects can be printed at energy dosages of less than 35, less than 20 or less than or equal to 10 mJ/cm$^2$. The ability to print at lower energy dosages means that printing can be performed more quickly and that parts can be produced in a fraction of the time necessary for methods requiring higher energy dosages to effect cure.

Example 7

Figure 11:
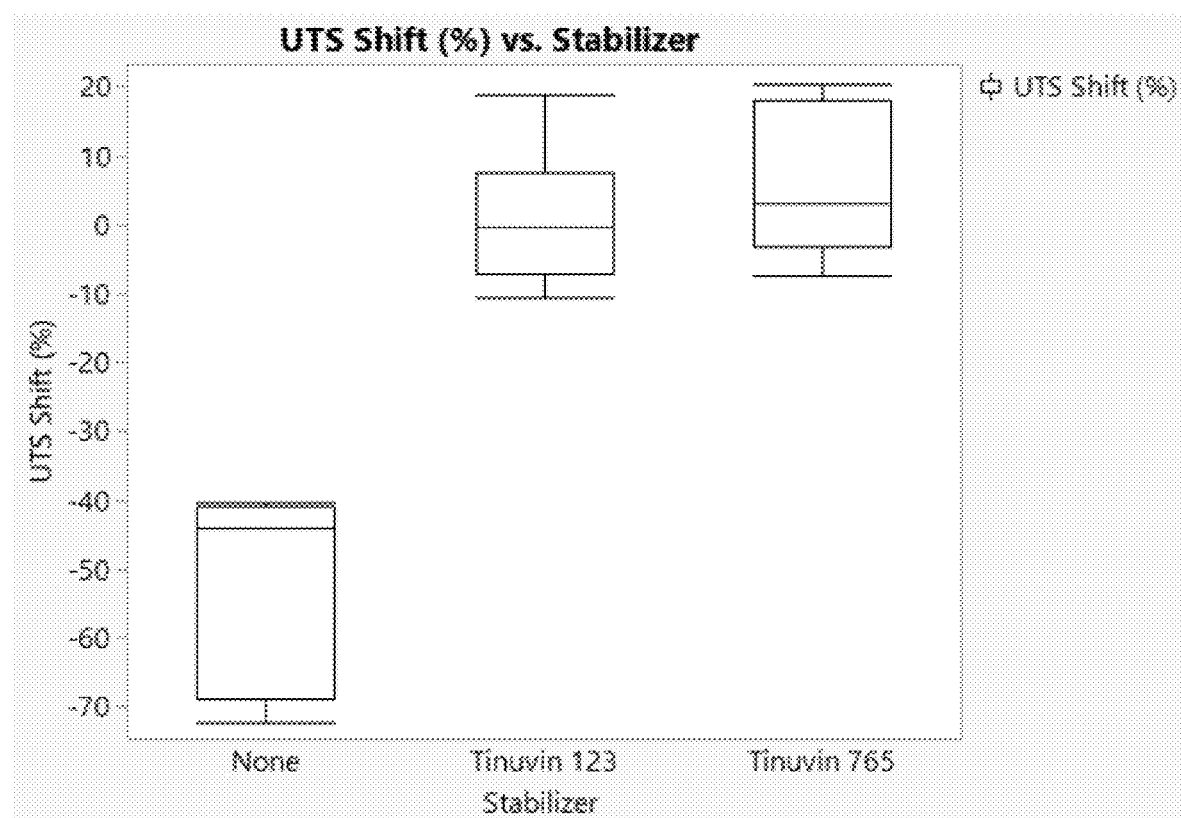
FIG. 11 shows ultimate tensile strength for compositions including a stabilizer.

Brittling behavior of the cured composition was examined. Additives of hindered amines were found to reduced brittling over a three month time period, as shown in FIG. 11.

Such alterations, modifications, and improvements are intended to be part of this disclosure and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and figures are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the figures. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A three-dimensional object made using a method comprising:
   providing a photocurable silicone composition in a vessel of an additive fabrication device;
   irradiating a layer of the photocurable silicone composition with an energy source to form an at least partially cured layer of the photocurable silicone composition on a build platform of the additive fabrication device or on a previously cured layer of the photocurable silicone composition;
   wherein the photocurable silicone composition comprises:
      a mercapto-derivatized polysiloxane having two or more functional groups;
      an alkenyl-derivatized polysiloxane; and
      a photo-initiator,
   wherein the three-dimensional object has a Shore A hardness of greater than 10, greater than 20, greater than 40 or greater than 60.

2. A three-dimensional object comprising a photocured silicone composition including a crosslinked alkenyl-derivatized polysiloxane and a mercapto-derivatized polysiloxane having two or more functional groups.

3. The three-dimensional object of claim 2, wherein the photocured silicone composition has a ratio of mercapto-derivatized polysiloxane to alkenyl-derivatized polysiloxane by weight of less than 50:50, less than 40:60, or less than 30:70.

4. The three-dimensional object of claim 2, wherein the mercapto-derivatized siloxane comprises a QT resin, a QM resin, a QDT resin, a D resin, a QTM resin, a QTDM resin, or a combination thereof.

5. The three-dimensional object of claim 2, wherein alkenyl-derivatized siloxane comprises a QT resin, a QM resin, a QDT resin, a D resin, a QTM resin, a QTDM resin, or a combination thereof.

6. The three-dimensional object of claim 2, wherein the mercapto-derivatized siloxane comprises a QT resin, a QM resin, a QDT resin, a D resin, a QTM resin, a QTDM resin, or a combination thereof.

7. The three-dimensional object of claim 2, wherein the mercapto-derivatized siloxane comprises a resin including alkylthiol groups.

8. The three-dimensional object of claim 2, wherein the alkenyl-derivatized polysiloxane includes a plurality of vinyl groups.

9. The three-dimensional object of claim 2, wherein the alkenyl-derivatized polysiloxane includes a plurality of acrylate groups.

10. The three-dimensional object of claim 2, wherein the photocurable silicone composition comprises a flame retardant.

11. The three-dimensional object of claim 2, wherein the photocurable silicone composition comprises an odor neutralization agent.

12. The three-dimensional object of claim 2, wherein the photocurable silicone composition comprises a scent masking agent.

* * * * *